US008055821B2

United States Patent
Gimness et al.

(10) Patent No.: US 8,055,821 B2
(45) Date of Patent: Nov. 8, 2011

(54) APPARATUS, SYSTEM, AND METHOD FOR CONVERTING A SYNCHRONOUS INTERFACE INTO AN ASYNCHRONOUS INTERFACE

(75) Inventors: Joseph Andrew Gimness, Tucson, AZ (US); Brian Sean McCain, Tucson, AZ (US); Jason Lee Peipelman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1997 days.

(21) Appl. No.: 10/991,271

(22) Filed: Nov. 17, 2004

(65) Prior Publication Data

US 2006/0117322 A1 Jun. 1, 2006

(51) Int. Cl.
*G06F 3/00* (2006.01)
*G06F 13/00* (2006.01)
*G06F 5/00* (2006.01)
*G06F 13/12* (2006.01)
*G06F 13/38* (2006.01)
*G06F 15/16* (2006.01)

(52) U.S. Cl. ............... 710/58; 710/30; 710/33; 710/62; 710/110; 711/140; 709/230

(58) Field of Classification Search .................. None
See application file for complete search history.

(56) References Cited

U.S. PATENT DOCUMENTS

| | | | | |
|---|---|---|---|---|
| 4,631,666 A | | 12/1986 | Harris et al. ................ 364/200 |
| 5,170,476 A | * | 12/1992 | Laakso et al. ............... 711/140 |
| 5,199,106 A | * | 3/1993 | Bourke et al. ............... 710/110 |
| 5,625,847 A | | 4/1997 | Ando et al. .................. 395/880 |
| 5,754,823 A | | 5/1998 | Mudryk, Jr. et al. .......... 395/500 |
| 5,944,799 A | | 8/1999 | Smoot, III et al. ............. 710/8 |
| 6,075,830 A | * | 6/2000 | Piirainen .................... 375/354 |
| 6,226,666 B1 | | 5/2001 | Chang et al. ................. 709/202 |
| 6,490,623 B1 | * | 12/2002 | Wesley ...................... 709/227 |
| 6,848,060 B2 | * | 1/2005 | Cook et al. .................. 713/400 |
| 6,886,041 B2 | * | 4/2005 | Messinger et al. ........... 709/226 |
| 6,961,863 B2 | * | 11/2005 | Davies et al. ................ 713/500 |
| 7,350,184 B2 | * | 3/2008 | Upton ........................ 717/100 |
| 7,631,092 B2 | * | 12/2009 | Barnes ....................... 709/230 |
| 2003/0093499 A1 | * | 5/2003 | Messinger et al. ........... 709/219 |
| 2005/0234928 A1 | * | 10/2005 | Shkvarchuk et al. ......... 707/100 |

OTHER PUBLICATIONS

Vermeulen, Allan. "An Asynchronous Design Pattern." Dr. Dobb's Portal: The World of Software Development (Jun. 1, 1996). Dec. 7, 2007 <http://www.ddj.com/184409898>.*
Allan Vermeulen, "An Asynchronous Design Pattern, A pattern for managing concurrency—written in Java", http://www.ddj.com/documents/s=960/ddj9606d/9606d.htm ,10pgs.

* cited by examiner

*Primary Examiner* — Tariq Hafiz
*Assistant Examiner* — Henry Yu
(74) *Attorney, Agent, or Firm* — Kunzler Needham Massey & Thorpe

(57) ABSTRACT

An apparatus, system, and method are disclosed for converting a synchronous interface into an asynchronous interface. The apparatus includes a receive module, a generate module, and a return module. The receive module receives a request for a transaction from a synchronous requester, the generate module generates a delaying object and a forwarding interface compatible with the requested return type, and the return module returns the delaying object with the forwarding interface to the requester. Additionally, services for implementing such an apparatus, system, and method are disclosed. Implementation of the apparatus, system, and method provide for increased computing performance, reduced application run time, and decreased usage of computing resources.

16 Claims, 7 Drawing Sheets

APPARATUS, SYSTEM, AND METHOD FOR CONVERTING A SYNCHRONOUS INTERFACE INTO AN ASYNCHRONOUS INTERFACE

BACKGROUND OF THE INVENTION

1. Field of the Invention

This invention relates to computer interfaces and more particularly relates to converting a synchronous interface into an asynchronous interface.

2. Description of the Related Art

Generally, computer code runs more efficiently when it is written in a modular format. The most common code configurations include a main block of code which calls other peripheral blocks of code to perform certain tasks and return the results of those tasks. In most cases, the main code expects the results to be returned in a particular format. The particular format expected for the return is commonly referred to as the return type. The term "type," as used herein, refers to the format of the return object as commonly used in the art of computer programming. The peripheral blocks of code are often referred to as functions, modules, methods, and other like terms. As used herein, the peripheral blocks of code are referred to as functions.

Interactions between the main code and the functions take place using interfaces. An interface may include a function call wherein the main code initiates a transaction with the function, and may also include a return port through which the function returns a value of a predetermined type to the main code. Typically, the interfaces require that certain parameters get passed to the function in a function call, and that the returned value be of a specific, commonly predetermined, type.

Similarly, transactions between computing devices must often conform to predetermined standards and formats. A communication from a first computing device to a second computing device is essentially just a function call from a main code on the first computing device to a function on the second computing device and the associated return. As used herein, the main code is referred to as the requestor. A requester may additionally include a function that calls another function, a computing device that requests a transaction with another computing device, and the like.

For example, an application on a client of a storage server may request that the storage server create a volume on the storage medium to store data generated by the application. The application code sends a request to the storage server, the storage server creates the volume on the storage medium, and the storage server returns a confirmation that the volume has been created. In this example, the request from the application is similar to a function call. Indeed, the request may be the direct result of a function call. The confirmation that the storage server sends back is like the return value that the function returns. Likewise, the application expects that the returned confirmation will be in a specific predetermined format. The request and associated return are herein referred to as transactions.

The example above describes a typical synchronous interface. An interface is synchronous if the requestor stops and waits until the function completes the requested task and returns a return object of the expected type. An interface is asynchronous if the requestor does not stop processing other jobs while waiting for the return object of the expected type. Asynchronous interfaces are generally much more efficient, because the code or application does not have to wait for a return object for each request before sending the next request. Additionally, asynchronous interfaces allow the application or code to process other tasks as well as sending and receiving transactions simultaneously.

For example, in an asynchronous system an application sends a request to a storage server to create a new volume on the storage medium. The application may then send an additional request for data stored in a file prior to receiving the return object from the first request confirming that the volume was created. In an asynchronous system, the idle time between requests and returns is greatly reduced.

It is clear from the example above, that in many cases an asynchronous interface is far superior, in terms of performance, to a synchronous interface. Unfortunately, converting a synchronous interface into an asynchronous interface has not traditionally been an easy task to accomplish. If attempted at all, converting the interface has required extensive modifications to the synchronous code and potential hardware changes.

From the foregoing discussion, it should be apparent that a need exists for an apparatus, system, and method that convert a synchronous interface into an asynchronous interface. Beneficially, such an apparatus, system, and method would increase processing performance. Additionally, system and network performance may be greatly improved where the apparatus, system, and method are implemented in a system or network environment. Most notably, implementation of such an apparatus, system, and method may not require modification of existing interface code or hardware.

SUMMARY OF THE INVENTION

The present invention has been developed in response to the present state of the art, and in particular, in response to the problems and needs in the art that have not yet been fully solved by currently available computer interface solutions. Accordingly, the present invention has been developed to provide an apparatus, system, and method for converting a synchronous interface into an asynchronous interface that overcome many or all of the above-discussed shortcomings in the art.

The apparatus to convert a synchronous interface into an asynchronous interface in one embodiment is provided with a logic unit containing a plurality of modules configured to functionally execute the necessary steps of receiving a request for a transaction from a synchronous requester, generating a delaying object and a forwarding interface compatible with the requested return type, and returning the delaying object with the forwarding interface to the requester. These modules in the described embodiments include a receive module, a generate module, and a return module.

In one embodiment, the apparatus includes a receive module configured to receive a request for a transaction from a synchronous requester. The apparatus may further comprise a block module. The block module blocks further requests for the transaction from the synchronous requester until the transaction is available for completion. In another embodiment, the requestor simultaneously sends requests for transactions and processes returns for previously requested transactions.

In one embodiment, the apparatus includes a generate module configured to generate a delaying object and a forwarding interface compatible with the requested return type. The delaying object and the forwarding interface may be generated by separate and distinct sub-modules of the generate module. The apparatus may additionally include a satisfy module configured to satisfy the request for the transaction from the synchronous requester until the transaction is available for completion. In an additional embodiment, a notification module notifies the synchronous requestor via the delaying object when the transaction is available for completion.

In one embodiment, the apparatus includes a return module configured to return the delaying object with the forwarding interface to the requestor. The apparatus may also include an initiation module and a completion module. The initiation module initiates a second request for the transaction via the delaying object when the transaction is available for completion. The completion module completes the transaction by returning an object of the expected type.

In another embodiment, the apparatus may include a requesting module, a receiving module, and a processing module. The requesting module sends a request for a transaction. The receiving module receives a delaying object via an associated forwarding interface. The processing module continues processing tasks in response to receiving the delaying object.

A system of the present invention is also presented and is used to convert a synchronous interface into an asynchronous interface. In one embodiment, the system includes a synchronous requestor and a responder. The synchronous requestor sends a request for a transaction, receives a delaying object with an associated forwarding interface, and continues to process tasks in response to receiving the delaying object. The responder receives a request for a transaction from a synchronous requestor, generates a delaying object and a forwarding interface compatible with the requested return type, and returns the delaying object with the forwarding interface to the requestor.

A method of the present invention is also presented for converting a synchronous interface into an asynchronous interface. The method in the disclosed embodiments substantially includes the steps necessary to carry out the functions presented above with respect to the operation of the described apparatus and system. In one embodiment, the method includes receiving a request for a transaction from an asynchronous requestor, generating a delaying object and a forwarding interface compatible with the requested return type, and returning the delaying object with the forwarding interface to the requestor. The method also may include blocking, satisfying, notifying, initiating, and completing as described above.

A method for providing a service of the present invention is also presented for converting a synchronous interface into an asynchronous interface. The method in the disclosed embodiments substantially includes the steps necessary to implement the functions presented above with respect to the implementation of the described method, apparatus, and system. In one embodiment, the method includes receiving a request for a transaction from an asynchronous requester, generating a delaying object and a forwarding interface compatible with the requested return type, and returning the delaying object with the forwarding interface to the requestor.

In another embodiment, the method includes enabling the requestor to continue processing other transactions until receiving notification that the transaction is available for completion. In one embodiment, completing the transaction includes returning an object of the expected type via the delaying object.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
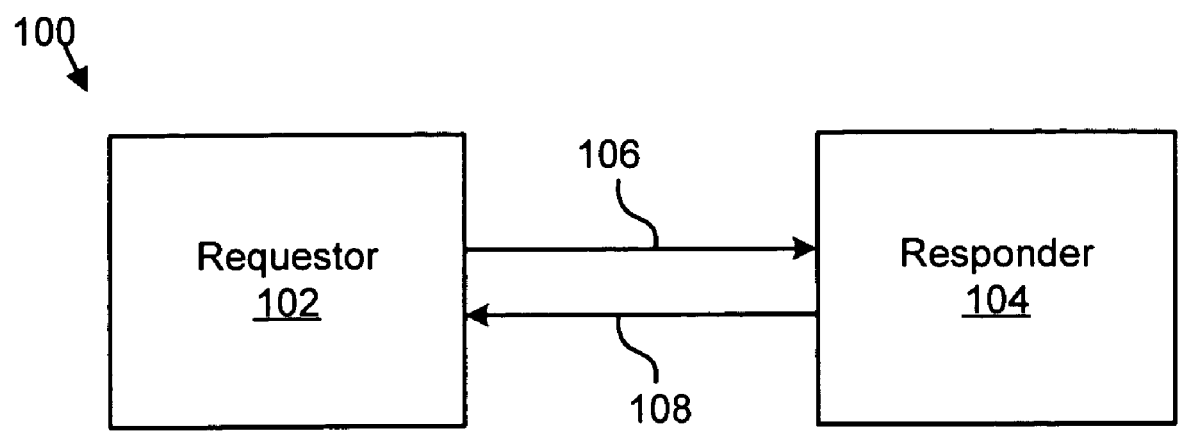
FIG. 1 is a schematic block diagram illustrating one embodiment of a system for converting a synchronous interface into an asynchronous interface.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Reference to service may include any conceivable service offering associated with analysis, design, implementation, or utilization of the disclosed apparatus, system, or method. A service may additionally include but is not limited to rental, lease, licensing, and other offering, contractual or otherwise, of hardware, software, firmware, network resources, data storage resources, physical facilities, and the like. Services may additionally include physical labor, consulting, and other offerings of physical, intellectual, and human resources.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for converting a synchronous interface into an asynchronous interface. The system 100 includes a requestor 102 and a responder 104. The requestor 102 communicates a request 106 for a transaction to the responder 104. Then, the responder 104 returns 108 an object to the requestor.

In one embodiment, the requestor 102 and the responder 104 are modules of computer readable code. The requestor 102 may include preexisting synchronous interfaces. In such an embodiment, modifications to the requestor's 102 interfaces may not be required. In one embodiment, the requestor 102 may be a main code or application. The requestor may request 106 transactions with a function or module. In one embodiment, such requests 106 are function calls. In another embodiment, the requester 102 is a computing device. For example, the requestor 102 may be a client of a Storage Area Network (SAN). The client may host an application that requests 106 transactions with the SAN, such as creating volumes to store data, retrieving data, and the like.

In one embodiment, the responder 104 may also be computer readable code. For example, the responder 104 may be a function, or module of an integrated software package that returns 108 a data object to the requestor. The responder 104 may return 108 the data object in response to a function call. In another example, the responder may be a computing or storage device. For example, the responder 104 may be a storage server that controls a storage device. The requestor 102 may request 106 a create volume transaction. The responder 104 may then create the volume and return 108 a create volume object indicating that the volume has been successfully created.

One example of the system 100 may include a Java application interacting with a storage device. In such an example, the Java application is the requestor 102 and the storage device is the responder 104. The application may request 106 a transaction with the storage device for data retrieval. The storage device then retrieves the data from the storage medium, and returns 108 the data in a predetermined format to the application. The application is considered synchronous if it did not process other tasks while waiting for the data object to be returned 108.

In an alternative example, the storage device 104 may first return a delaying object with an interface that is compatible with the expected data type, then retrieve the data from the storage medium, and finally return the data of the expected data type to the requestor 102. Returning the delaying object allows the synchronous requestor 102 to continue processing other tasks, thereby converting it into an asynchronous interface.

Figure 2:
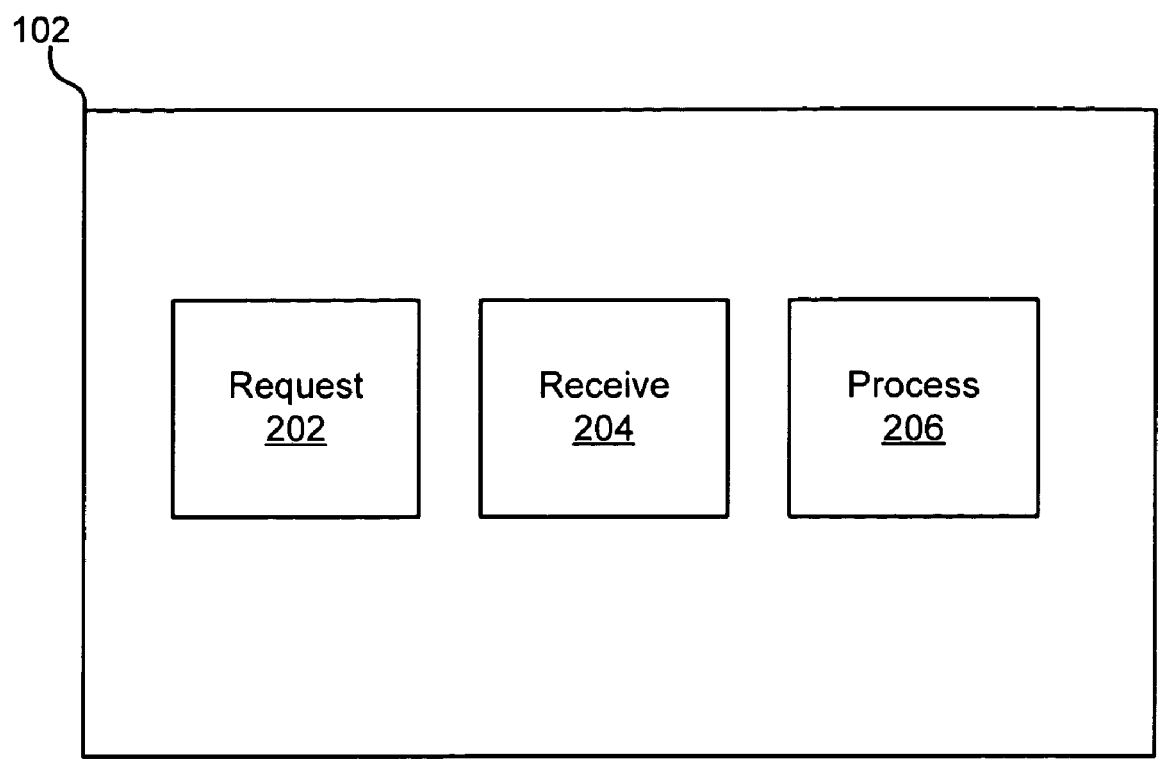
FIG. 2 is a schematic block diagram illustrating one embodiment of an apparatus for converting a synchronous interface into an asynchronous interface.

FIG. 2 is a schematic block diagram illustrating one embodiment of an apparatus 102 for converting a synchronous interface into an asynchronous interface. In one embodiment, the apparatus 102 is the requester 102 of system 100. The requestor 102 as depicted includes a request module 202, a receive module 204 and a process module 206. The requestor 102 may include preexisting synchronous interfaces.

In one embodiment, the request module 202 sends a request for a transaction to a responder 104. The request may include a function call, an application transaction, a data transfer, and the like. Requests may be made of a module of computer readable code, a computing device, a storage device and the like.

The receive module 204 receives an object returned by the responder 104. Typically, a synchronous requester 102 has a predetermined format expected for the returned object. An object may be a complex data construct such as the results of a complex command, or simply a single bit set to high or low. If the receive module 204 contains an existing interface, the return data type may be defined by that interface. Typically such an interface would complicate process of converting from synchronous to asynchronous. However, as discussed later in reference to FIG. 3 and FIG. 7, the present invention circumvents such problems with the use of a forwarding interface.

The process module 206 continues to process tasks in response to receiving the delaying object. In one embodiment, the process module 206 is a data processor. In another embodiment, the process module 206 may be a main code, executable, application, and the like. Ordinarily, the synchronous interface would require that the process module 206 wait to perform other tasks subsequent to requesting a transaction until the receive module 204 receives the return object. However, in this embodiment, the process module 206 continues to process other tasks as soon as the receive module 204 receives the delaying object via the forwarding interface.

In one embodiment of the apparatus 102 the request module 202, the receive module 204, and the process module 206 may not require modifications. In fact, the interface on the synchronous requestor may not be modified at all. However, as will be made clear in the discussion to follow, introducing the delaying object may indirectly convert the synchronous interface into an asynchronous interface.

Figure 3:
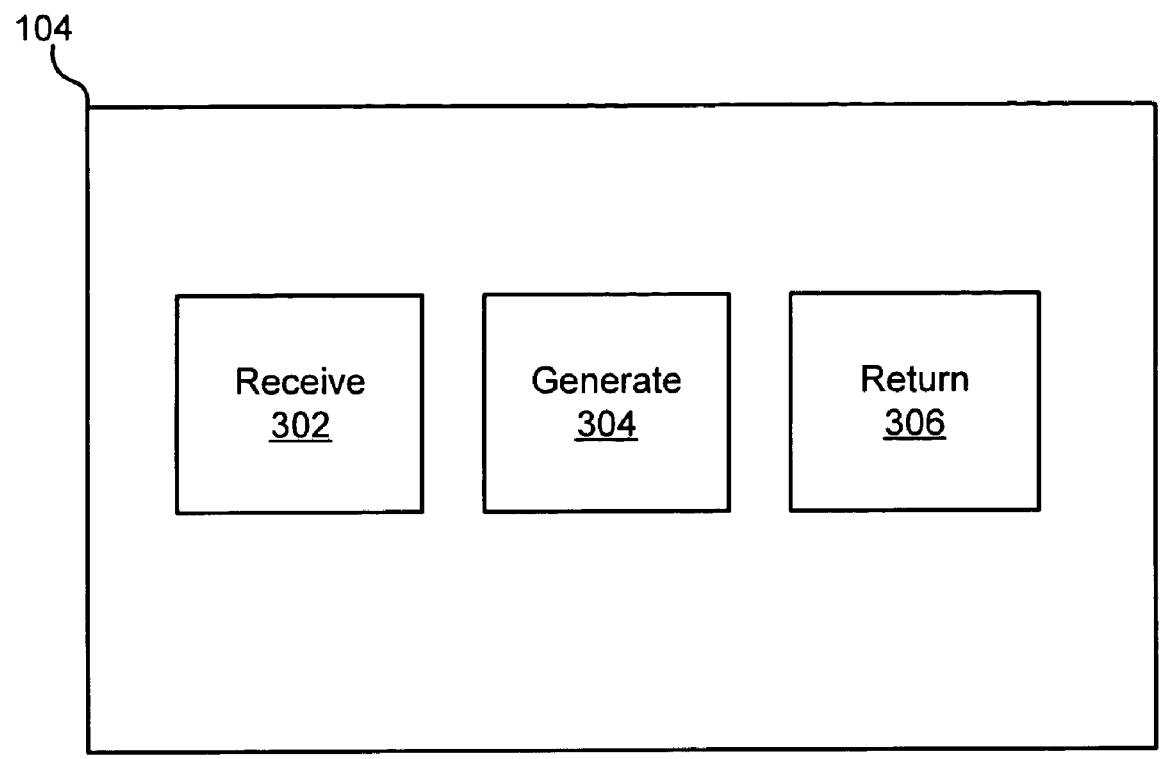
FIG. 3 is a schematic block diagram illustrating another embodiment of an apparatus for converting a synchronous interface into an asynchronous interface.

FIG. 3 is a schematic block diagram illustrating another embodiment of an apparatus 104 for converting a synchronous interface into an asynchronous interface. In one embodiment, the apparatus 104 is the requestor 102 of system 100. In embodiment, the requestor 102 includes a receive module 302, a generate module 304, and a return module 306.

The receive module 302 receives a request for a transaction from a synchronous requester 102. In one embodiment, the receive module 302 may be a software interface. For example, the receive module 302 may receive a function call from another module of computer readable code. In one embodiment, the request for transaction may pass certain parameters that determine the expected return type.

In one embodiment, the generate module 304 generates a delaying object and a forwarding interface compatible with the requested return type. The generate module 304 may generate both the delaying object and the forwarding interface simultaneously. Alternatively, the delaying object and the forwarding interface may be generated by separate submodules of the generate module. In another alternative embodiment, the generate module 304 may trigger other modules to generate the delaying object and the forwarding interface. In one embodiment, the delaying object generated by the generate module 304 may include an IOU object. The IOU object and the associated data class have a distinct interface format. Therefore, the IOU object requires a forwarding interface to associate with an existing synchronous interface. In one embodiment, the forwarding interface may include a dynamic proxy. IOU objects and dynamic proxies will be discussed further in relation to FIG. 7.

In one embodiment, the return module 306 returns the delaying object with the forwarding interface to the requester. In an additional embodiment, the return module 306 may also return the completed results of the transaction to the requestor 102. The return module 306 may return a data object in response to completion of a function. Alternatively, the return module may return the results of a requested transaction between components of a network.

Figure 4:
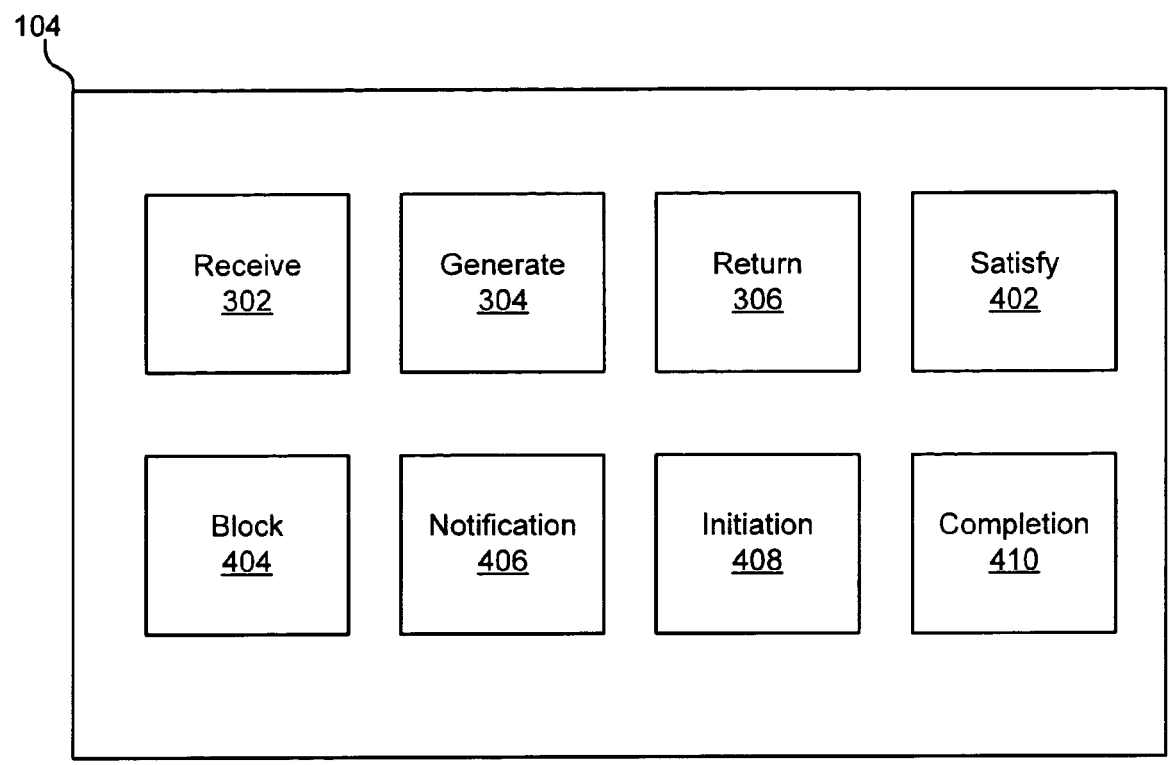
FIG. 4 is a detailed schematic block diagram illustrating one embodiment of an apparatus for converting a synchronous interface into an asynchronous interface.

FIG. 4 is a detailed schematic block diagram illustrating one embodiment of an apparatus 104 for converting a synchronous interface into an asynchronous interface. The apparatus 104 may include the receive module 302, the generate module 304 and the return module 306 as described in relation to FIG. 3. Additionally, the apparatus 104 may include a satisfy module 402, a block module 404, a notification module 406, an initiation module 408, and a completion module 410.

In one embodiment, the satisfy module 402 facilitates continued processing of other computing tasks while the requested transaction is in progress. The satisfy module 402 may satisfy the request for the transaction from the synchronous requestor until the transaction is available for completion. In one embodiment, the satisfy module 402 satisfies the request by recognizing the delaying object as a completed transaction. If the requestor 102 recognizes the delaying object as the completed transaction, the requestor 102 can continue to process other tasks.

In one embodiment, the block module 404 protects the responder 104 from multiple requests for the same task. If the requester 102 has an outstanding request for transaction, additional requests for the transaction may be sent. Multiple requests for the same transaction may reduce system performance and further delay completion of the transaction.

In one embodiment, the notification module 406 notifies the synchronous requestor via the delaying object when the transaction is available for completion. The notification module 406 may trigger a message to be sent to the requester 102. For example, the notification module 406 may trigger a predefined notification function of the delaying object to notify the requestor 102 that the transaction is available for completion.

In one embodiment, the initiation module 408 initiates a second request for the transaction via the delaying object when the transaction is available for completion. The satisfy module 402 temporarily satisfying the requestor 102 and the block module 404 blocking further requests for the transaction, the responder 104 can work on completing tasks necessary for completion of the transaction. When the transaction is available for completion, the responder 104 must trigger the completion of the transaction with the requestor 102. In one embodiment, the initiation module 408 triggers a function within the delaying object which initiates a second request for the transaction. In an alternative embodiment, the initiation module 408 sends a message to the requestor 102 indicating that the transaction is available for completion. The message may be sent via the delaying object.

In one embodiment, the completion module 410 may complete the transaction by returning via the return module 306 the completed return data object of the expected type in place of the delaying object. Alternatively, the completion module 410 may return the data object of the expected type in response to a second request from the requestor 102. The completion module 410 may send the data object directly. Alternatively, the completion module 410 may send the data object via the return module 306.

Figure 5:
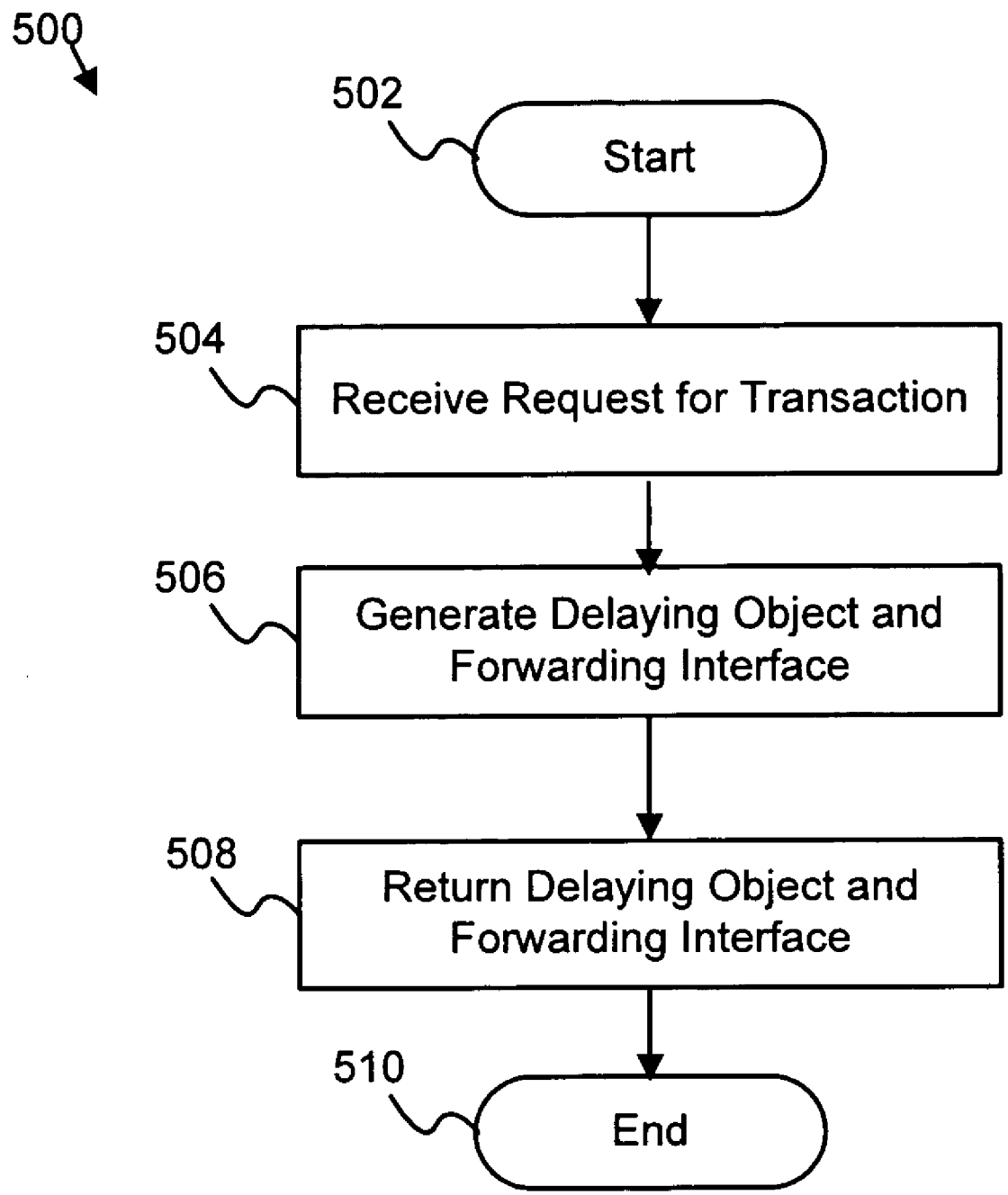
FIG. 5 is a schematic flow chart diagram illustration one embodiment of a method for converting a synchronous interface into an asynchronous interface.

FIG. 5 is a schematic flow chart diagram illustration one embodiment of a method 500 for converting a synchronous interface into an asynchronous interface. The method 500 starts 502 and the receive module 302 receives 504 a request for a transaction. Next, the generate module 304 generates 506 a delaying object and a forwarding interface. The return module 306 then returns 508 the delaying object and the forwarding interface to the requestor 102, and the process 500 ends 510.

In one embodiment, the method 500 is implemented as part of a method for providing a service of converting a synchronous interface into an asynchronous interface. In one embodiment, the service may include additional steps associated with analysis, design, and implementation of the apparatus 102, 104, system 100 and method 500 described above. The service may include additional steps as described in relation to FIG. 6.

Figure 6:
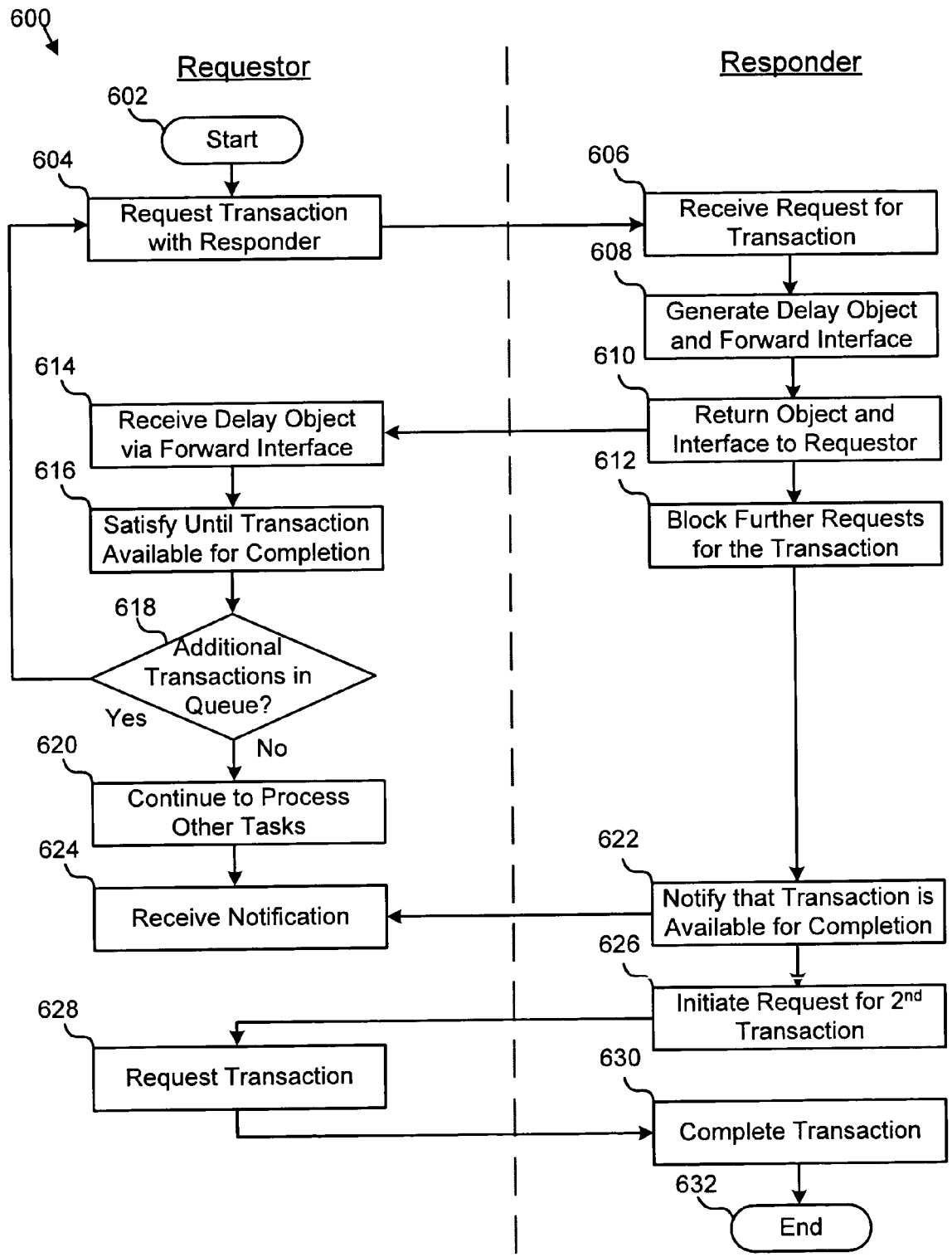
FIG. 6 is a detailed schematic flow chart diagram illustration one embodiment of a method for converting a synchronous interface into an asynchronous interface.

FIG. 6 is a detailed schematic flow chart diagram illustration one embodiment of a method 600 for converting a synchronous interface into an asynchronous interface. In one embodiment, the method 600 includes steps that may be performed by the requestor 102, and the responder 104. The method 600 starts 602 when the request module 202 on the requestor 102 requests 604 a transaction with the responder 104. The receive module 302 of the responder 104 then receives 606 the request for a transaction. The generate module 304 of the responder 104 then generates 608 a delay object and a forward interface. The return module 306 of the responder 104 then returns 610 the delaying object with the forwarding interface to the requestor 102.

In one embodiment, the receive module 204 of the requestor 102 receives 614 the delaying object and the forwarding interface. In one embodiment the satisfy module 402 then satisfies 616, via the delaying object, the requestor 102 until the transaction is available for completion. The block module 404 may additionally block 612 further requests from the requestor 102 for the transaction. Once satisfied 616, the process module 206 of the requestor 102 may then determine 618 if additional transactions are queued for request. If so 618, the request module 202 then sends 604 requests for additional transactions to the responder 104, and the process 600 proceeds in similar fashion for additional transaction requested. If no 618 additional transactions are required, the process module 206 of the requestor 102 may continue 620 to process other tasks.

In one embodiment, the notification module 406 then notifies 622 the requestor 102 that the transaction is available for completion. The receive module 204 of the requestor 102 receives 624 the notification from the responder 104, and the process module 206 prepares to complete the transaction. The initiation module 408 initiates 626 a second request for the transaction. The request module 202 of the requestor 102 then requests 628 completion of the transaction. The completion module 410 of the responder 104 then completes 630 the transaction and the method 600 ends 632.

Figure 7:
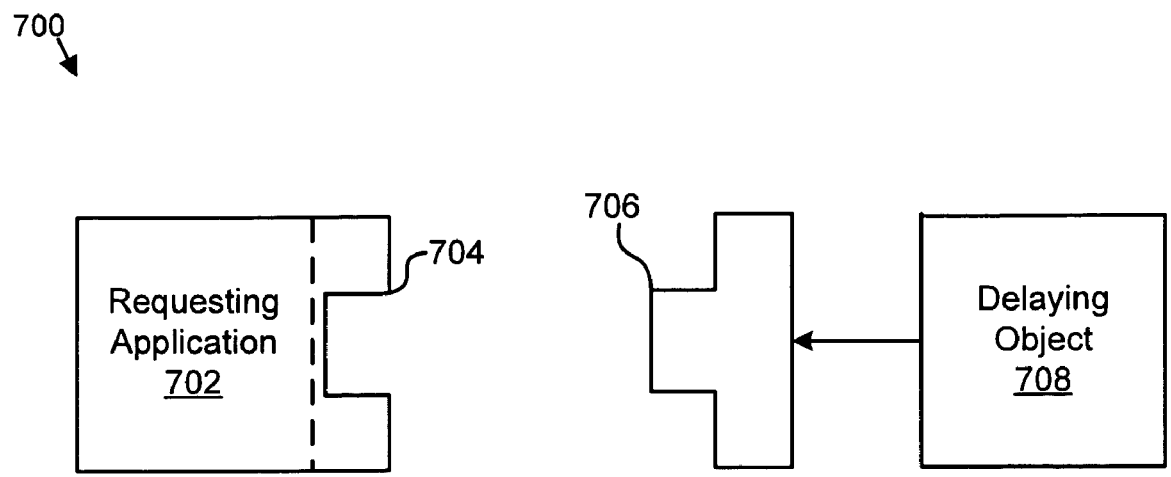
FIG. 7 is a schematic block diagram illustrating interaction between the requesting application, the forwarding interface, and the delaying object.

FIG. 7 is a schematic block diagram illustrating interaction 700 between a requesting application 702, the forwarding interface 706, and the delaying object 708. In one embodiment, the requestor 102 is a requesting application 702. The requesting application 702 make requests for transactions and receives return data objects via the interface 704. In one embodiment, the interface 704 is preconfigured to accept only a particular format of return data object. The expected format is called the object data type.

As disclosed in the discussion above, a delaying object 708 may be returned in response to the request for a transaction instead of the expected data object. The delaying object 708 satisfies the requestor 102 and allows the requestor 102 to continue processing other tasks while the responder 104 processes the transaction.

One example of a delaying object 708 is an IOU object defined by an IOU data class in the Java programming language. When returned to the requester 102 in the place of the expected data object, the requester 102 may be satisfied that the transaction has been temporarily completed. The IOU object may perform basic operations on the requestor 102. One such operation is the standby( ) operation which indicates that the transaction is in process, and the requestor 102 may continue processing other tasks. Additional operations may include closed( ), redeem( ), and addCallback( ). The closed( ) operation indicates that the transaction results are available for completion. The redeem( ) operation returns the owed data object to the requestor 102 via the IOU object. The addCallback( ) operation may initiate a second request for the transaction when the transaction is available for completion. Although the IOU object may operate as a delaying object 708, other embodiments of the delaying object 708 may be implemented.

One fundamental problem associated with the use of the delaying object 708 is that the delaying object 708 may not have the required interface type. A delaying object 708 may be a generic tool used in response to requests for a variety of transactions. Therefore, the generating module 304 generates both a delaying object 708 and a forwarding interface 706. The forwarding interface 706 is may be compatible with both the interface 704 of the requesting application 702, and the interface type of the delaying object 708. The forwarding interface 706 may function as an adapter connecting the delaying object 708 with the requesting application 702.

One example of a forwarding interface 706 may include a dynamic proxy of the Java programming language. A dynamic proxy may be passed several parameters when instantiated. These parameters may include target, method, and parameters. The target parameter indicates the real data object being proxied. In one example, the target may be the delaying object 708. The method parameter indicates the method or function that was originally requested to perform the transaction. The indicated method or function may be the responder 104. The 'parameters' parameter includes the data originally sent by the request for transaction. These parameters may help the dynamic proxy determine the object data type expected by the interface 704.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to convert a synchronous interface into an asynchronous interface, the apparatus comprising:
   a receive module comprising executable code stored on a storage device, executed by a processor, and configured to receive a request for a transaction from a synchronous requestor;
   a generate module comprising executable code stored on the storage device, executed by the processor, and configured to generate a delaying object and a forwarding interface compatible with a requested return type, wherein the delaying object is configured as an IOU object defined by a JAVA® IOU data class and performs a standby( ) operation indicating that the transaction is in process; and
   a return module comprising executable code stored on the storage device, executed by the processor, and configured to return the delaying object with the forwarding interface to the requestor;

a satisfy module comprising executable code stored on the storage device, executed by the processor, and configured to satisfy the request for the transaction from the synchronous requestor by recognizing the delaying object as a completed transaction until the transaction is available for completion wherein the requestor continues to process other transactions until the transaction is available for completion;

a notification module comprising executable code stored on the storage device, executed by the processor, and configured to notify the synchronous requestor via the delaying object when the transaction is available for completion; and an initiation module comprising executable code stored on the storage device, executed by the processor, and configured to initiate a second request for the transaction via the delaying object when the transaction is available for completion.

2. The apparatus of claim 1, further comprising a block module comprising executable code stored on the storage device, executed by the processor, and configured to block further requests for the transaction from the synchronous requestor until the transaction is available for completion.

3. The apparatus of claim 1, wherein the requestor simultaneously sends requests for transactions and processes returns for previously requested transactions.

4. The apparatus of claim 1, further comprising a completion module comprising executable code stored on the storage device, executed by the processor, and configured to complete the transaction by returning an object of the requested return type.

5. An apparatus to convert a synchronous interface into an asynchronous interface, the apparatus comprising:
a requesting module comprising executable code stored on a storage device, executed by a processor, and configured to send a request for a transaction;
a receiving module comprising executable code stored on the storage device, executed by the processor, and configured to receive a delaying object via an associated forwarding interface, wherein the delaying object is configured as an IOU object defined by a JAVA® IOU data class and performs a standby( ) operation indicating that the transaction is in process;
a processing module comprising executable code stored on the storage device, executed by the processor, and configured to continue processing tasks in response to receiving the delaying object, receive a satisfaction for the request by recognizing the delaying object as a completed transaction until the transaction is available for completion, receive a notification via the delaying object when the transaction is available for completion, and in response to an initiation, make a second request for the transaction via the delaying object when the transaction is available for completion.

6. A system to convert a synchronous interface into an asynchronous interface, the system comprising:
a synchronous requestor configured to send a request for a transaction; and
a responder configured to receive the request for the transaction from a synchronous requestor, generate a delaying object and a forwarding interface compatible with a requested return type, wherein the delaying object is configured as an IOU object defined by a JAVA® IOU data class and performs a standby( ) operation indicating that the transaction is in process, return the delaying object with the forwarding interface to the requestor, and satisfy the request for the transaction from the synchronous requestor by the synchronous requestor recognizing the delaying object as a completed transaction until the transaction is available for completion wherein the requestor continues to process other transactions until the transaction is available for completion;

the synchronous requester further configured to receive the delaying object with the associated forwarding interface, and continue to process tasks in response to receiving the delaying object and the satisfaction of the transaction request; and the responder further configured to notify the synchronous requestor via the delaying object when the transaction is available for completion and initiate a second request for the transaction via the delaying object when the transaction is available for completion.

7. The system of claim 6, wherein the responder is further configured to block further requests for the transaction from the synchronous requestor until the transaction is available for completion.

8. The system of claim 6, wherein the responder is further configured to complete the transaction by returning an object of the requested return type.

9. The system of claim 8, wherein the requestor simultaneously sends requests for transactions and processes returns for previously requested transactions.

10. A program of executable code stored on a storage device, executed by a processor, and configured to perform operations for converting a synchronous interface to an asynchronous interface, the operations comprising:
receiving a request for a transaction from a synchronous requestor;
generating a delaying object and a forwarding interface compatible with a requested return type, wherein the delaying object is configured as an IOU object defined by a JAVA® IOU data class and performs a standby( ) operation indicating that the transaction is in process;
returning the delaying object with the forwarding interface to the requestor;
satisfying the request for the transaction from the synchronous requestor by recognizing the delaying object as a completed transaction until the transaction is available for completion wherein the requestor continues to process other transactions until the transaction is available for completion;
notifying the synchronous requestor via the delaying object when the transaction is available for completion; and
initiating a second request for the transaction via the delaying object when the transaction is available for completion.

11. The program of claim 10, wherein the instructions further comprise an operation to block further requests for the transaction from the synchronous requestor until the transaction is available for completion.

12. The program of claim 10, wherein the requestor simultaneously sends requests for transactions and processes returns for previously requested transactions.

13. The program of claim 10, wherein further comprising an operation to complete the transaction by returning an object of the requested return type.

14. A method for providing a service of converting a synchronous interface into an asynchronous interface, the method comprising:
receiving a request for a transaction from a synchronous requestor;
generating a delaying object and a forwarding interface compatible with a requested return type, wherein the delaying object is configured as an IOU object defined by a JAVA® IOU data class and performs a standby( ) operation indicating that the transaction is in process; and returning the delaying object with the forwarding interface to the requestor;

satisfying the request for the transaction from the synchronous requestor by recognizing the delaying object as a completed transaction until the transaction is available for completion wherein the requestor continues to process other transactions until the transaction is available for completion;

notifying the synchronous requestor via the delaying object when the transaction is available for completion; and initiating a second request for the transaction via the delaying object when the transaction is available for completion.

15. The method of claim 14, wherein completing the transaction further comprises returning an object of the requested return type via the delaying object.

16. An apparatus to convert a synchronous interface into an asynchronous interface, the apparatus comprising:

means for receiving a request for a transaction from a synchronous requestor, the receiving means comprising executable code stored on a storage device and executed by a processor;

means for generating a delaying object and a forwarding interface compatible with a requested return type, wherein the delaying object is configured as an IOU object defined by a JAVA® IOU data class and performs a standby( ) operation indicating that the transaction is in process, the generating means comprising executable code stored on the storage device and executed by the processor;

means for returning the delaying object with the forwarding interface to the requestor, the returning means comprising executable code stored on the storage device and executed by the processor;

means for satisfying the request for the transaction from the synchronous requestor by recognizing the delaying object as a completed transaction until the transaction is available for completion wherein the requestor continues to process other transactions until the transaction is available for completion, the satisfying means comprising executable code stored on the storage device and executed by the processor;

means for notifying the synchronous requestor via the delaying object when the transaction is available for completion, the notifying means comprising executable code stored on the storage device and executed by the processor; and means for initiating a second request for the transaction via the delaying object when the transaction is available for completion, the initiating means comprising executable code stored on the storage device and executed by the processor.

* * * * *